(12) United States Patent
Childs et al.

(10) Patent No.: US 7,962,739 B2
(45) Date of Patent: Jun. 14, 2011

(54) RECOVERING FROM HARD DISK ERRORS THAT CORRUPT ONE OR MORE CRITICAL SYSTEM BOOT FILES

(75) Inventors: Philip Lee Childs, Raleigh, NC (US); Donald R. Frame, Apex, NC (US); Jeffrey R. Hobbet, Holly Springs, NC (US); Howard Jeffrey Locker, Cary, NC (US); Michael Terrell Vanover, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 702 days.

(21) Appl. No.: 12/036,564

(22) Filed: Feb. 25, 2008

(65) Prior Publication Data

US 2009/0217024 A1  Aug. 27, 2009

(51) Int. Cl.
*G06F 15/177* (2006.01)
(52) U.S. Cl. .................................. 713/2; 713/1; 713/100
(58) Field of Classification Search .................. 713/1, 2, 713/100
See application file for complete search history.

(56) References Cited

U.S. PATENT DOCUMENTS

| | | | | |
|---|---|---|---|---|
| 5,666,335 A * | 9/1997 | Horibe | ................. | 369/53.36 |
| 6,415,382 B1 * | 7/2002 | Kwan | .................. | 713/2 |
| 6,427,215 B2 * | 7/2002 | Rafanello et al. | ............. | 714/710 |
| 7,200,771 B2 * | 4/2007 | Bolt et al. | ................. | 714/8 |
| 7,506,224 B2 * | 3/2009 | Ejiri et al. | ................. | 714/710 |
| 7,657,794 B2 * | 2/2010 | Ichikawa et al. | ................. | 714/42 |
| 7,734,945 B1 * | 6/2010 | Levidow et al. | ................. | 714/3 |
| 2007/0100905 A1 * | 5/2007 | Masters et al. | ................. | 707/201 |

* cited by examiner

*Primary Examiner* — Nitin C Patel
(74) *Attorney, Agent, or Firm* — VanLeeuwen & VanLeeuwen; Carlos Munoz-Bustamante (57) ABSTRACT

A system, method, and program product is provided that recovers from a sector error affecting a critical file. A damaged sector prevents a critical file from being read prevents the computer system from booting. A controller records a sector number corresponding to the damaged sector. The system is rebooted using an alternative boot media. The system accesses the primary nonvolatile storage media after the rebooting. The damaged sector number is read from the error log and a file map is used to determine the critical file that is stored in the damaged sector. A backup copy of the critical file is retrieved from a backup media. The backup copy is written to the primary media using undamaged sectors and the critical file is mapped to the undamaged sectors. The system is subsequently booted successfully from the primary nonvolatile storage media.

17 Claims, 6 Drawing Sheets

RECOVERING FROM HARD DISK ERRORS THAT CORRUPT ONE OR MORE CRITICAL SYSTEM BOOT FILES

BACKGROUND OF THE INVENTION

1. Technical Field

The present invention relates to a system, method, and program product that recovers from critical system errors. More particularly, the present invention relates to a system, method, and program product that recovers a critical system file corrupted by a hard disk error.

2. Description of the Related Art

Hard disk (nonvolatile storage) errors can result in an unreadable area on a nonvolatile storage device. If the error affects an area on the nonvolatile storage device, such as a hard disk sector, where a critical system file (or part of a critical system file) is stored, the critical file is not able to be read and executed and the computer system cannot be properly booted by the operating system.

One approach to resolving errors that affect critical system files is recovering from a backup media taken of the computer system's nonvolatile storage. One challenge of this approach is that many users do not routinely backup their computer system often due to forgetfulness or the time, effort, and resources needed to perform a full system backup. In addition, even if a full backup is performed periodically, files created or modified since the last backup will be lost when the full system recovery is performed. Another challenge, as alluded to above, is that, similar to a full system backup, a full system recovery may be quite time consuming, especially if the nonvolatile storage device is large or if the speed of the interface with the backup media is somewhat slow.

Another approach to resolving errors that affect critical system files that prevent the operating system from loading is reloading the operating system. A challenge of this approach is that reloading the operating system, such as from the media provided by the operating system provider, such as Microsoft Corporation, results in the loss of patches and updates that were loaded and installed on the computer system since the initial install of the operating system. Operating system updates are often security updates that address particular security issues with the operating system. Reloading the initial version of the operating system would result in increased system vulnerability as these security updates would not be present. To address these issues, after reinstalling the operating system, the user would have to download and install the previously installed updates and patches, resulting in additional time needed to recover from the nonvolatile storage area.

Another approach, especially if the computer system is under a manufacturer's warranty, is to return the computer system to the manufacturer for repair. Thousands of computer systems are returned to manufacturers because of minor nonvolatile storage (e.g., disk) errors that affect critical operating system files and prevent the systems from booting properly. This approach is challenging to both the users and the manufacturers. The challenge faced by the users is that the computer system will be unavailable for an extended period of time while it is repaired by the manufacturer. Exacerbating this challenge, manufacturers often replace the nonvolatile storage device with a different new or refurbished device that has been preloaded with the operating system. This results in the loss of any applications and data files loaded on the computer system by the user, unless such applications and data files have been backed up by the user on a backup media. The challenge faced by manufacturers is the costs associated with repairing systems with minor nonvolatile storage (disk) errors. Costs are incurred by help desk personnel in discussing the problem with the user and requesting the user to return the system, shipping costs, costs of the new or refurbished nonvolatile storage device, and costs of replacing the drive.

SUMMARY

It has been discovered that the aforementioned challenges are resolved using a system, method and computer program product that recovers from a sector error affecting a critical file. During a computer system boot sequence, an attempt is made to read a critical file that is stored in one or more sectors of a primary nonvolatile storage media where one of the sectors is damaged. The damage prevents the critical file from being read from the primary nonvolatile storage media and therefore preventing the computer system from booting from the primary nonvolatile storage media. A controller, such as a hard disk drive controller, records a sector number corresponding to the damaged sector. The computer system is rebooted using an alternative boot media, such as an alternative media located on a second partition. The computer system is able to access the primary nonvolatile storage media after the rebooting. During the recovery process, the damaged sector number is read and a file map is analyzed in order to determine the critical file that is stored in the damaged sector. A backup copy of the critical file that corresponds to the critical file identifier is retrieved from a backup media. The backup copy is written to the primary nonvolatile storage media using undamaged sectors. The writing of the file replaces the critical file by altering the file map to associate the critical file identifier with the undamaged sectors. After the file is restored, the computer system is booted from the primary nonvolatile storage media. During the booting, the replaced critical file is read and executed from the undamaged sectors.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
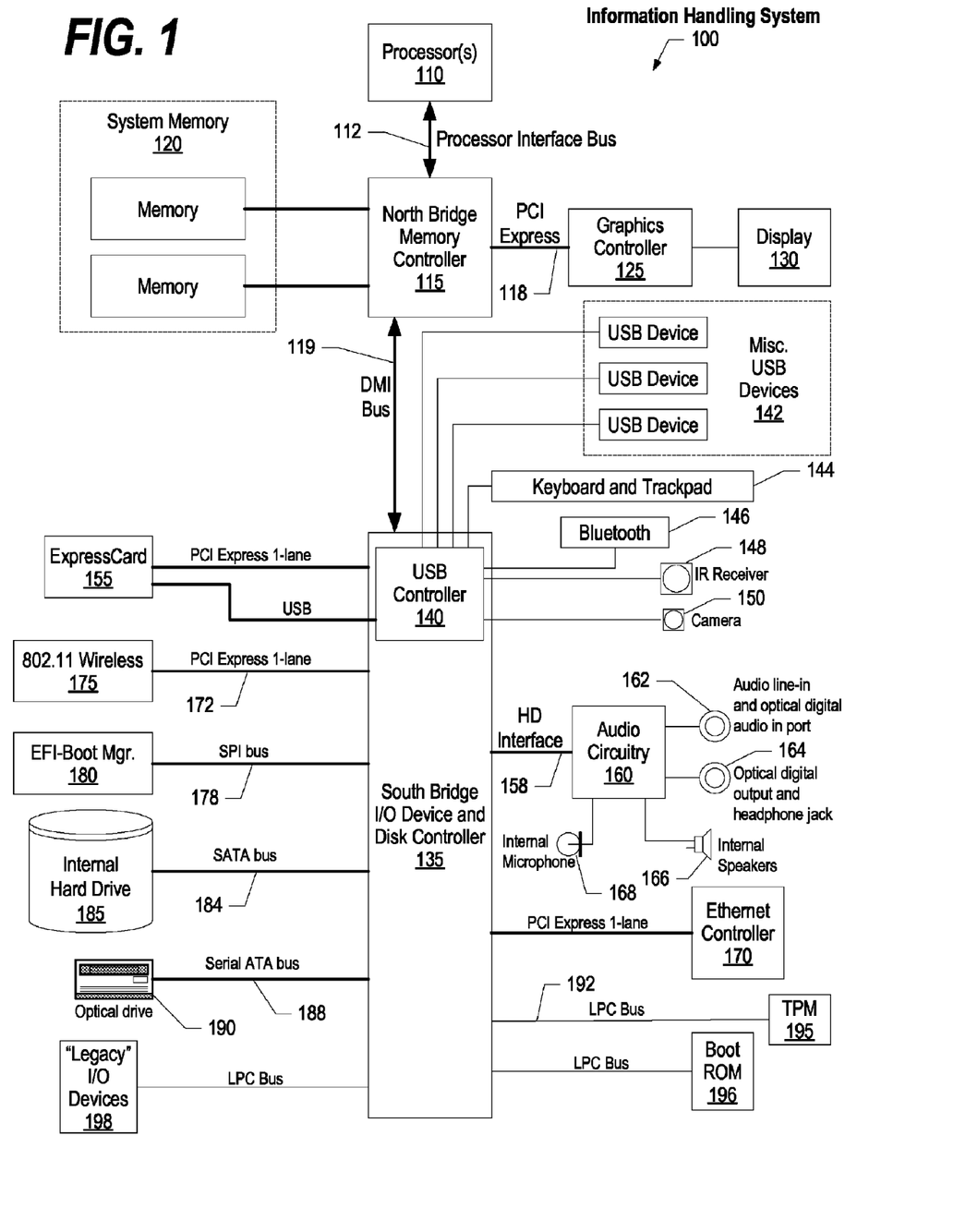
FIG. 1 is a block diagram of a data processing system in which the methods described herein can be implemented.
Figure 2:
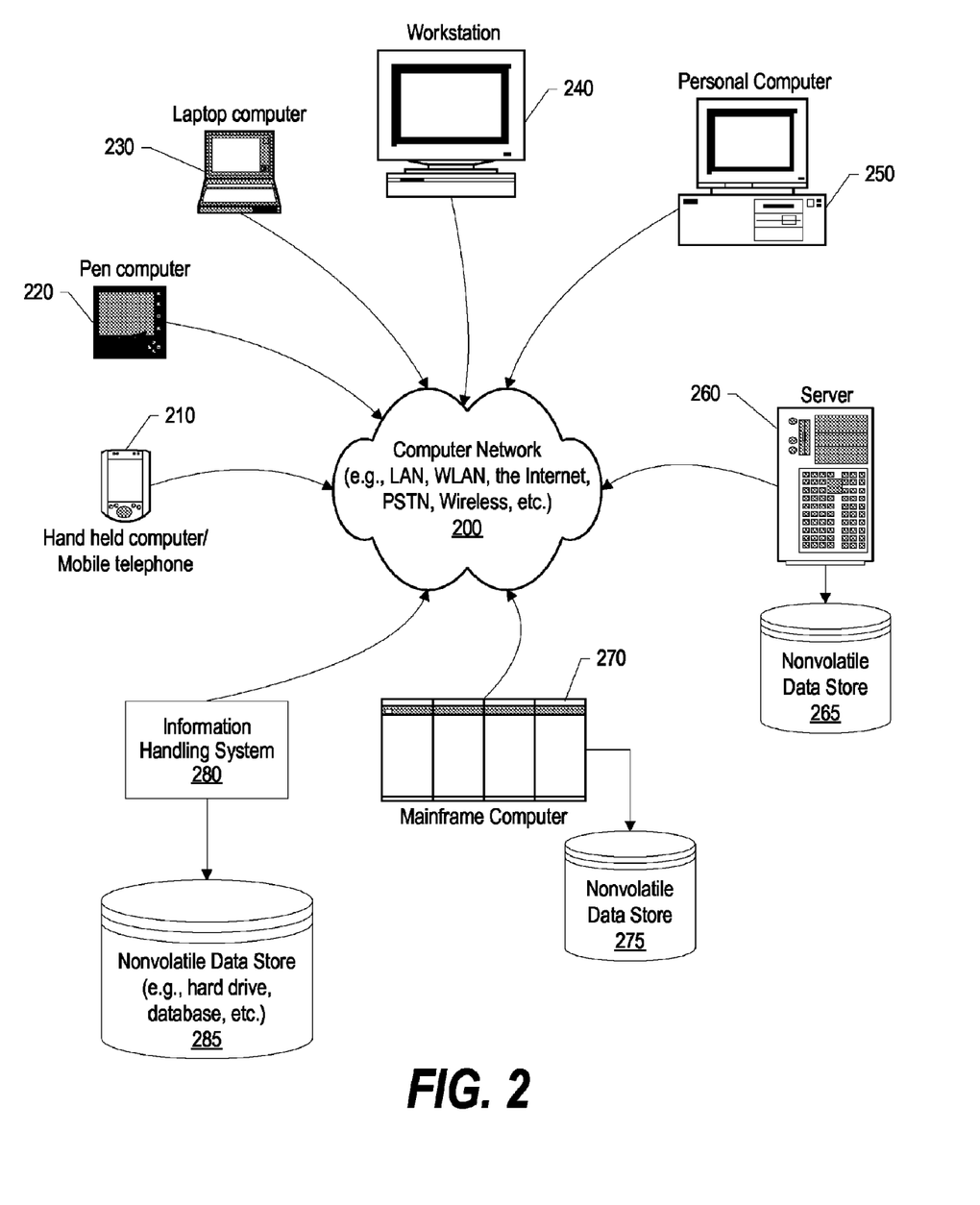
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 185, such as a hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etc.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, removable nonvolatile storage device 145 can be shared amongst two or more information handling systems using various techniques, such as connecting the removable nonvolatile storage device 145 to a USB port or other connector of the information handling systems.

Figure 3:
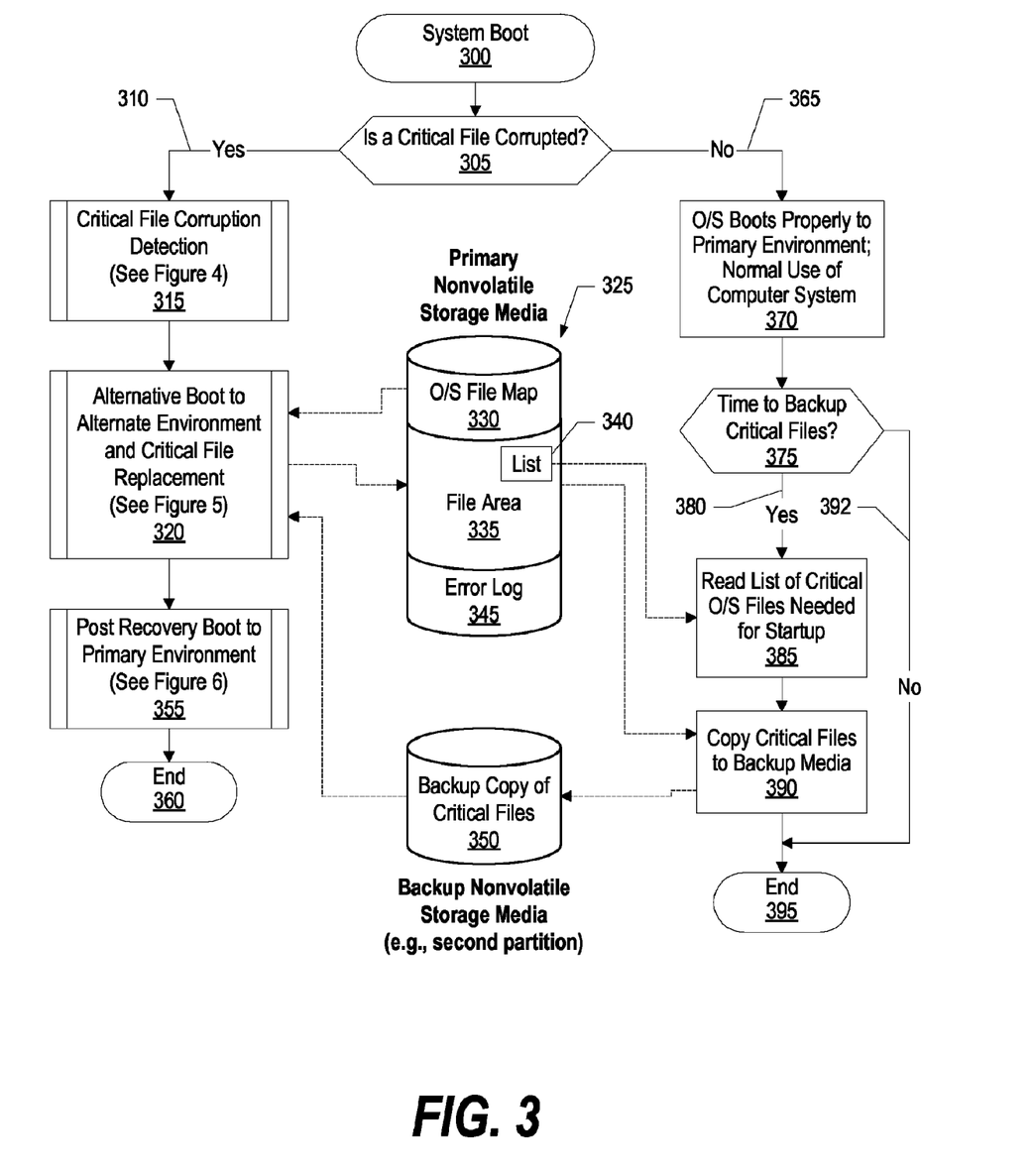
FIG. 3 is a high level flowchart showing steps taken in anticipating a corrupted critical file and steps taken to detect a corrupted critical file and recover the critical file.

FIG. 3 is a high level flowchart showing steps taken in anticipating a corrupted critical file and steps taken to detect a corrupted critical file and recover the critical file. Processing commences at 300 when the user boots the computer system to a primary environment (e.g., by turning on the computer system or by requesting a boot which is accomplished on many IBM PC compatible systems by pressing a key sequence such as ctrl+alt+del, as known by those skilled in the art). During the boot process, a determination is made as to whether a critical file is corrupted (unreadable), and therefore unable to be read (decision 305). When a sector of the primary nonvolatile storage media used to boot the computer system is damaged and that damaged sector is used to store a critical operating system file used to boot the computer system, then the computer system will not be able to properly boot using the primary nonvolatile media and will be unable to initialize the primary environment.

If a critical file is corrupted (e.g., stored in an area of the primary nonvolatile storage media where a sector has become damaged), then decision 305 branches to "yes" branch 310. At predefined process 315 actions are performed to detect the critical file corruption (see FIG. 4 and corresponding text for processing details). In some embodiments, when a corrupted critical file is encountered the computer system will "hang" and the user will be forced to reboot the computer system (e.g., turn the computer system "off" and "on" again). The computer system is rebooted to an alternate environment using an alternative media since the system cannot be booted to the primary environment from the primary nonvolatile storage media due to the damaged (unreadable) sector. At predefined process 320, an alternative boot sequence is performed and the critical file is replaced from backup media 350 (see FIG. 5 and corresponding text for processing details). After the critical file has been restored from the backup storage media, at predefined process 355 the computer system is rebooted to the primary environment using the primary nonvolatile storage media now that the damaged sector is no longer being used to store the critical file. The user is now able to use the computer system as normal and processing ends at 360.

Returning to decision 305, if a critical file is not corrupted, the computer system is able to properly boot to the primary environment using the primary nonvolatile storage media and, consequently, decision 305 branches to "no" branch 365 for normal operations. At step 370, the operating system boots properly from the primary nonvolatile storage media and the user is able to use the computer system as intended. Periodically (e.g., once per day, week, etc.) critical files that are needed to initialize the primary environment are backed up. A determination is made as to whether it is time to backup critical files from primary nonvolatile storage media 325 (decision 375). If it is time to backup critical files, decision 375 branches to "yes" branch 380 whereupon, at step 385, list 340 is read from primary nonvolatile storage media 325. List 340 is a listing of identifiers (e.g., filenames, etc.) that are critical operating system files that are needed to boot the operating system. At step 390, the critical files that are needed to boot the operating system are copied from file area 335 of primary nonvolatile storage media 325 to backup nonvolatile storage media 350. In one embodiment, backup nonvolatile storage media is a second (e.g., hidden) partition of a hard drive with the primary nonvolatile storage media occupying a first (e.g., non-hidden) partition of the hard drive. As shown, file map 330 is stored on primary nonvolatile storage media 325 and maps the file identifiers stored in file area 335 with the specific sectors where the files are stored on the nonvolatile storage media. Error log 345 is a log of errors encountered by the controller of primary nonvolatile storage media 325, such as a hard disk controller. When the controller encounters an error in reading or writing data to primary nonvolatile storage media 325 it writes the sector number of the sector that it was unable to read or write. Returning to decision 375, if it is not time to backup the critical files, then decision 375 branches to "no" branch 392 bypassing the critical file backup steps. Processing then ends at 395.

Figure 4:
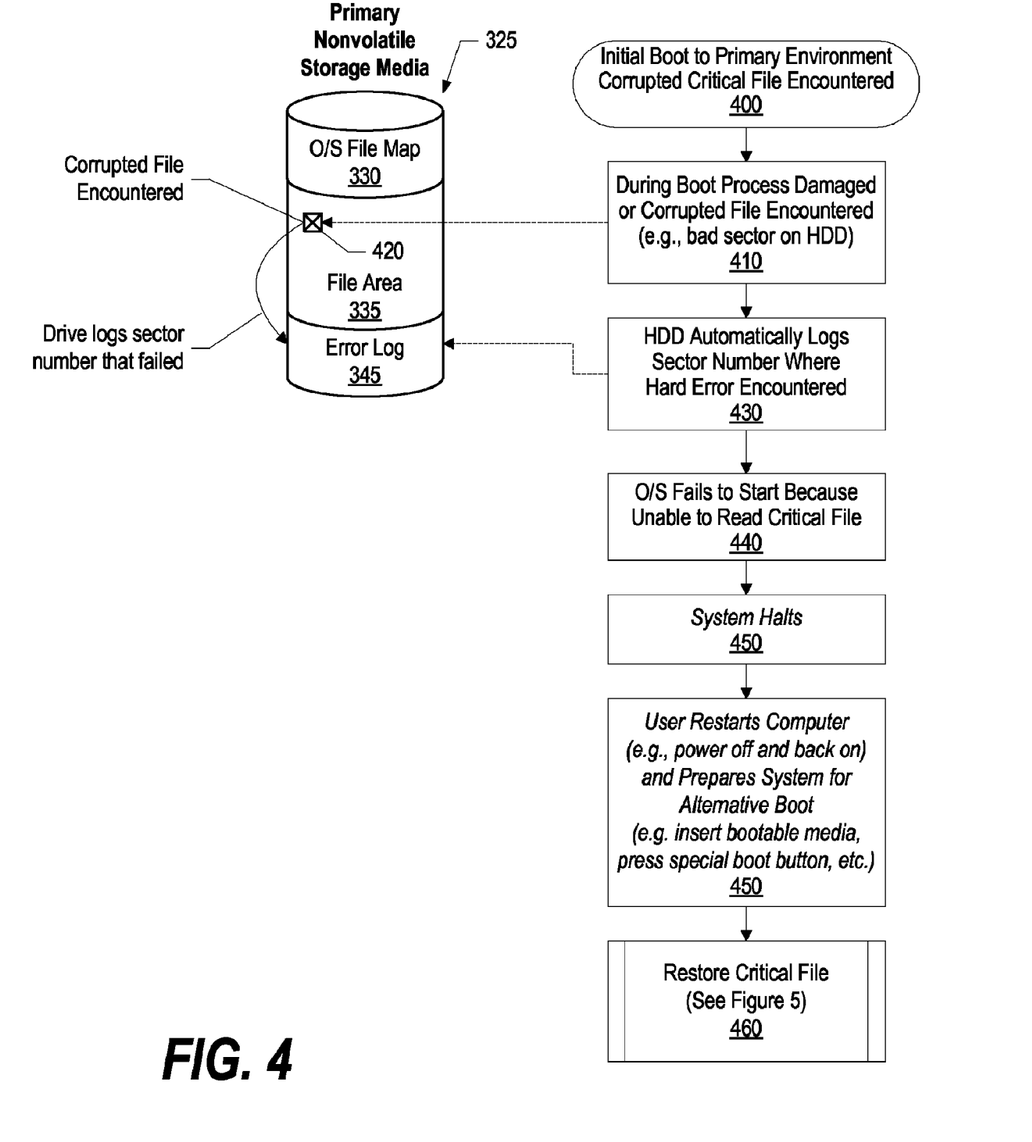
FIG. 4 is a flowchart showing steps performed in detecting a corrupted (unreadable) critical file error.

FIG. 4 is a flowchart showing steps performed in detecting a corrupted critical file error. Processing commences at 400 whereupon, at step 410, during the boot process to initialize the primary environment, a damaged or corrupted (unreadable) file is encountered on the primary nonvolatile storage media 325, for example a sector used to store one of the critical files is damaged (unreadable) so that the controller cannot read the sector from the primary nonvolatile storage media. In the example shown, critical file 420 (e.g., "sys.exe") is unable to be read from file area 335 of primary nonvolatile storage media 325. At step 430, the controller of the primary nonvolatile storage media (e.g., a hard disk drive controller) automatically writes the sector number where the hard error was encountered. At step 440, the operating system fails to complete its startup sequence and therefore fails to boot the computer system to the primary environment because critical file 440 was unable to be read from primary nonvolatile storage media 325. At step 450 the system halts due to the failure of the operating system to properly initialize to the primary environment.

At step 450, the user of the computer system restarts the computer system and directs the computer system to boot to an alternate environment using an alternate boot media. To restart the computer system, the user can simply turn the system off and back on again. The user directs the computer system to boot using an alternative boot media by either inserting an alternative boot media in a media device (such as inserting a bootable CD-ROM in a CD-ROM device of the computer system) and directing the computer system to boot from the alternative boot media. Some computer systems are configured to boot, upon request, from a bootable CD being detected in a CD-ROM drive. In other computer systems, the boot sequence employed by the computer system can be altered by resetting BIOS settings. The BIOS settings can be viewed and altered by pressing a certain key combination while the computer system is performing pre-boot operations. On other systems, especially ThinkPad™ brand laptop computer systems manufactured by the Lenovo corporation, a special "Access" button is available that the user can press in order to boot from a second boot media, such as a second partition of the primary nonvolatile storage media. This second partition is usually hidden so that, while using the primary partition, a user does not accidentally delete or overwrite the booting and recovery files located on the second partition. At predefined process 460, the computer system reboots to the alternate environment using the alternate boot media and runs a restore and recovery process to restore the damaged critical file (see FIG. 5 and corresponding text for processing details).

Figure 5:
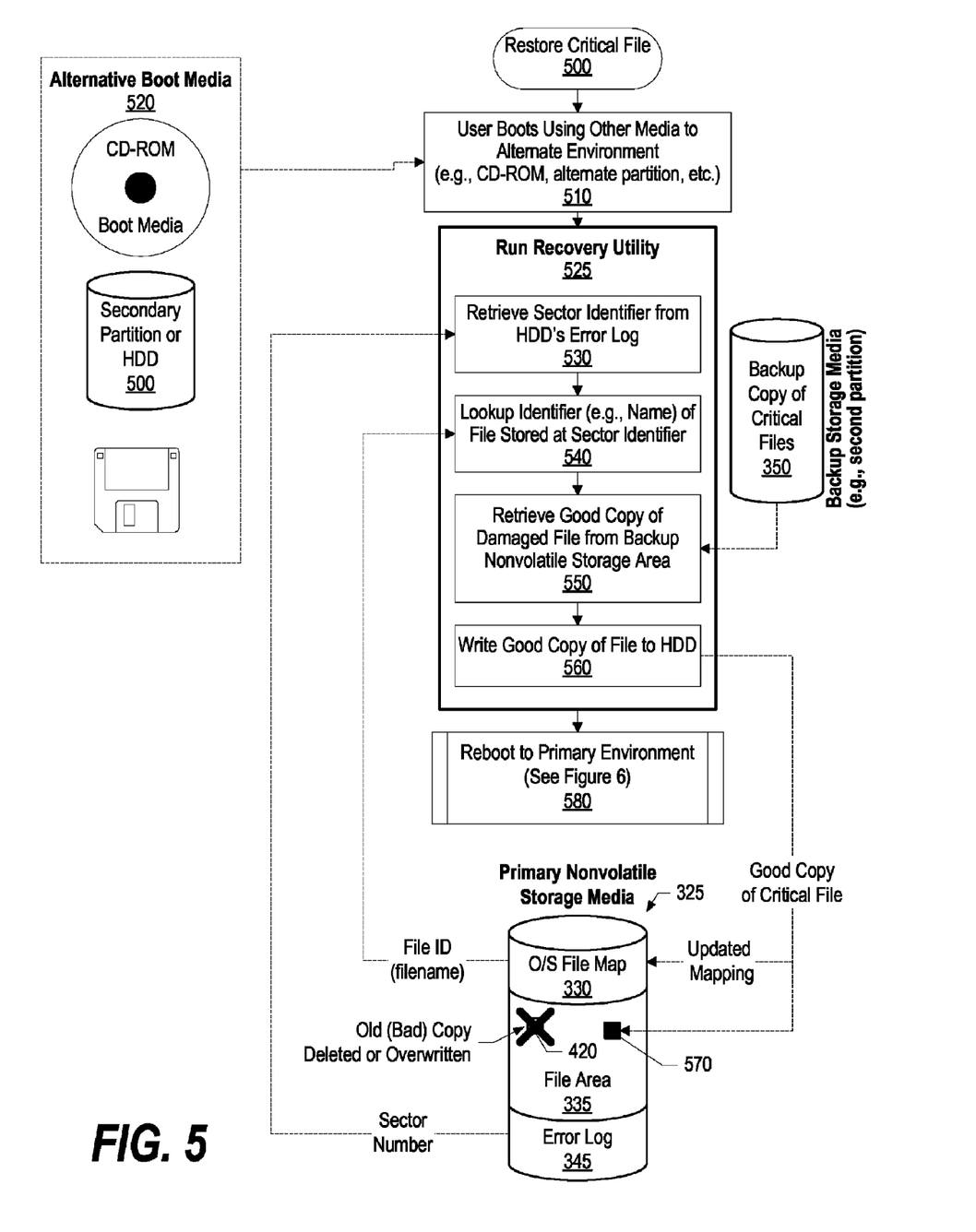
FIG. 5 is a flowchart showing steps taken to restore a critical file after it has been discovered that the critical file is corrupted.

FIG. 5 is a flowchart showing steps taken to restore a critical file after it has been discovered that the critical file is corrupted. Processing commences at 500 whereupon, at step 510, the user boots the computer system to the alternate environment using alternate boot media 520. As shown, alternate boot media can include many sources such as a CD-ROM, a diskette, and a secondary partition or secondary hard drive, from which the computer system can be booted.

After booting the computer system to the alternate environment, recovery utility 525 is executed. During execution of the recovery utility, at step 530, a sector number is retrieved from error log 345 stored in primary nonvolatile storage media 325. As previously described, when a hard error is encountered when reading or writing from primary nonvolatile storage media 325, the controller, such as a hard disk controller, writes the sector number of the damaged (unreadable) sector to error log 345. At step 540, the recovery utility analyzes file map 330 and determines the file identifier (e.g., filename, path+filename, etc.) that is stored at the damaged (unreadable) sector. As previously described, file map 330 includes a mapping of the files stored on the primary nonvolatile storage media and the sector, or sectors, where the file is stored. For example, if sector "163" is damaged and all or part of critical file "sys.exe" is stored at sector "163," then file map 330 would show that "sys.exe" is stored at sector number "163." At step 550, the recovery utility retrieves another copy of the file from backup nonvolatile storage media 350. In one embodiment, the backup copies of the critical files are stored in another area, such as the hidden partition mentioned above, of the primary nonvolatile storage media. At step 560, the recovery utility writes a good copy of the file to the primary nonvolatile storage media (file 570) and the old (corrupted) copy of the file (file 420) is deleted or overwritten. The file mapping is also updated to reflect the new location of the file. When the backup copy is written it copies over the original file in the file system structure. The file may be written to the same sectors that were used to store the original (unreadable) copy of the file or to different sectors. The specific sectors used in copying the backup copy to the primary nonvolatile storage are determined by the drive controller and this sector data is stored in the file map that maps the file identifier to the sectors actually used to store the file in the primary nonvolatile storage media. Using the example from above, if the new (replacement) copy of "sys.exe" is now stored at sector number "324", file map 330 will show that sys.exe is now at sector number 324 and is not at sector number 163. Now, when the computer system is rebooted, the copy of "sys.exe" that is located at sector number "324" will be executed instead of the corrupted version of "sys.exe" that was located at sector number "163" which was identified as being an unreadable sector.

Figure 6:
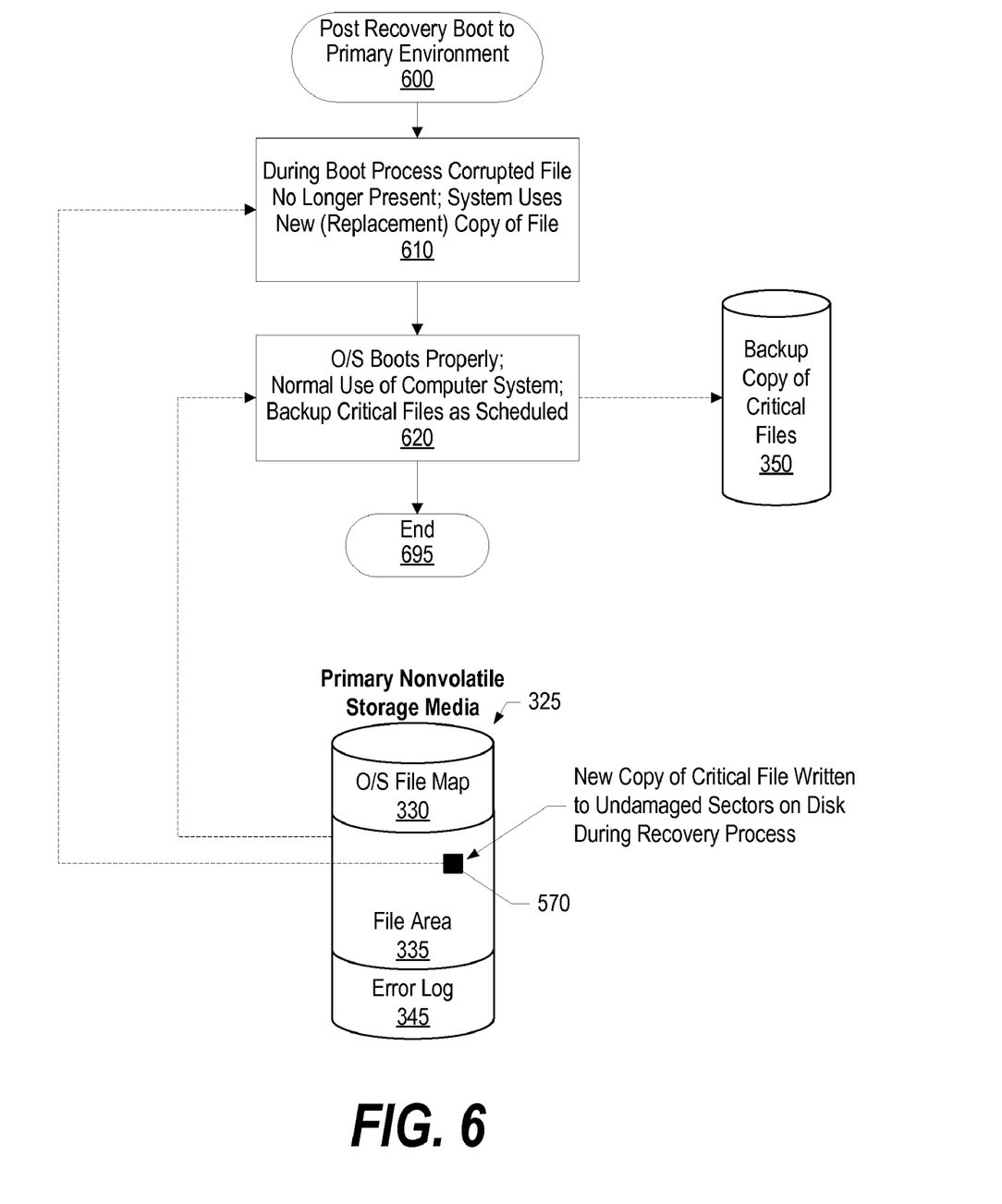
FIG. 6 is a flowchart showing post-recover boot steps performed after the critical file has been restored.

After the recovery utility has successfully recovered the critical file from backup storage media 350, at predefined process 580, the user reboots the computer system to the primary environment using the primary nonvolatile storage media (see FIG. 6 and corresponding text for processing details).

FIG. 6 is a flowchart showing post-recover boot steps performed after the critical file has been restored. Processing commences at 600 whereupon, during the boot process, the operating system successfully boots from the primary nonvolatile storage media an initializes the primary environment. Step 610 depicts the step at which the formerly unreadable file is now successfully read from the primary nonvolatile storage media after having been recovered from the backup media. Because the critical file is no longer stored in an unreadable sector, the critical file is able to be read and, in the case of an executable, executed by the computer system. Step 620 depicts the operating system booting properly using the restored critical file. Normal use of the computer system using the operating system is now possible. Periodically, as shown in FIG. 3, the critical files needed to boot the operating system are backed up onto the backup media. Processing thereafter ends at 695.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by a computer system, said method comprising:
   detecting that a file is unreadable, wherein the detecting occurs while booting the computer system to a primary environment, wherein the unreadable file is critical to the primary environment, and wherein the unreadable file causes a primary environment boot failure;
   recording a sector number corresponding to an unreadable sector of a primary nonvolatile storage media encountered while the computer system is booting to the primary environment, wherein data corresponding to the unreadable file is stored in the unreadable sector;
   in response to the primary environment boot failure, booting the computer system to an alternate environment using an alternate boot media, wherein the computer system has access to the primary nonvolatile storage media from the alternate environment;
   while the computer system is in the alternate environment:
      reading the recorded sector number;
      mapping the recorded sector number to the unreadable file, wherein the mapping comprises reading a file map stored on the primary nonvolatile storage media, the file map including a plurality of file identifiers and a plurality of sector numbers corresponding to one or more files stored on the primary nonvolatile storage media;
      identifying the unreadable file based on the mapping of the unreadable sector number to a selected one of the plurality of file identifiers that corresponds to the unreadable file;
      retrieving, from a backup media, a backup copy of the unreadable file based on the selected file identifier; and
      writing the backup copy to one or more undamaged sectors of the primary nonvolatile storage media wherein the writing replaces the unreadable file with the backup copy, resulting in a replaced file within a file system structure; and
   after the replacement of the unreadable file, successfully rebooting the computer system from the primary nonvolatile storage media into the primary environment, the rebooting including reading the replaced file from the one or more undamaged sectors.

2. The method of claim 1 wherein the alternate boot media is a second partition of the primary nonvolatile storage media, and wherein the booting the computer system to the alternate environment further comprises:
   receiving a selection from a user of the computer system indicating that the user has pressed a physical button located on a surface of the computer system, wherein the booting of the computer system to the alternate environment is performed in response to receiving the selection.

3. The method of claim 1 further comprising:
   while operating in the primary environment, periodically backing up the files corresponding to the plurality of file identifiers to the backup media.

4. The method of claim 3 wherein the backup media is a second partition of the primary nonvolatile storage media.

5. The method of claim 1 further comprising:
   receiving an operating system update of one of the files listed in the plurality of file identifiers, wherein the files that correspond to the plurality of file identifiers are operating system files used to initialize the operating system;
   storing the received file in the primary nonvolatile storage media where the received file will be executed a next time the primary environment is initialized; and
   updating a backup copy of the received file stored on the backup media by writing the received file to the backup media.

6. The method of claim 1 wherein the alternate boot media is a second partition of the primary nonvolatile storage media, the booting the computer system to the alternate environment further comprising:
   receiving a selection from a user of the computer system indicating that the user has pressed a physical button located on the computer system, wherein the booting of the computer system to the alternate environment is performed in response to receiving the selection; and
   executing a recovery utility stored on the second partition, wherein the recovery utility performs steps of:
   reading the sector number recorded by a controller of the primary nonvolatile storage media, wherein the controller is a hard disk drive controller and wherein the sector number is read from an error log maintained by the hard disk drive controller;
   selecting the selected file identifier from the file map, the file map being maintained by an operating system that executes in the primary environment; and
   retrieving the backup copy of the unreadable file from a backup storage area included in the second partition.

7. A information handling system comprising:
   one or more processors;
   a memory accessible by at least one of the processors;
   a primary nonvolatile storage device accessible by at least one of the processors, the primary nonvolatile storage device including a primary nonvolatile storage media and a controller that controls data transmission to the primary nonvolatile storage media, wherein the primary nonvolatile storage media is divided into a plurality of sectors into which data files are stored;
   a plurality of primary environment files stored in a file system structure on the nonvolatile storage media, the primary environment files used to boot the information handling system from the primary nonvolatile storage media to a primary environment, wherein a sector used to store one of the primary environment files has become unreadable resulting in the corresponding primary environment file being unreadable by the controller;
   an error log that is updated by the controller when an error is encountered, wherein a sector number corresponding to the unreadable sector has been written to the error log by the controller;
   a file map that maps file identifiers of each file stored on the primary nonvolatile storage to at least one sector number where a corresponding file is stored on the primary nonvolatile storage media;

an alternate boot media accessible by at least one of the processors and a device that reads the alternate boot media;
a set of instructions which are loaded into memory and executed by at least one of the processors while the information handling system is booted from the alternate boot media in order to perform actions of:
reading the sector number of the unreadable sector from the error log;
mapping the sector number of the unreadable sector to the unreadable primary environment file, the mapping comprising reading the file map;
identifying the unreadable primary environment file based on the mapping of the recorded sector number to a selected one of the file identifiers that corresponds to the unreadable primary environment file;
retrieving a backup copy of the unreadable primary environment file that corresponds to the selected file identifier from a nonvolatile backup storage area;
writing the backup copy to one or more undamaged sectors of the primary nonvolatile storage media wherein the writing replaces the unreadable file with the backup copy, resulting in a replaced file within the file system structure.

8. The information handling system of claim 7 wherein the information handling system boots using the alternate boot media that is stored in a second partition of the primary nonvolatile storage media, and wherein the information handling system boots after receiving a selection from a user of the information handling system indicating that the user has pressed a physical button located on a surface of the information handling system.

9. The information handling system of claim 7 wherein the instructions executed by at least one of the processors perform additional actions comprising:
successfully booting the information handling system from the primary nonvolatile storage media after the replacement of the file, the booting including reading the replaced file from the one or more undamaged sectors;
after successfully booting the computer system, periodically backing up the files corresponding to the file identifiers included in the list to the nonvolatile backup storage area.

10. The information handling system of claim 9 wherein the nonvolatile backup storage area is a second partition of the primary nonvolatile storage media.

11. The information handling system of claim 9 wherein the instructions executed by at least one of the processors perform additional actions comprising:
receiving an operating system update of one of the files listed in the list of file identifiers;
storing the received file in the primary nonvolatile storage media where the received file will be executed the next time the system is booted; and
updating a backup copy of the received file stored on the backup media by writing the received file to the backup media.

12. The information handling system of claim 7 wherein the alternate boot media is a second partition of the primary nonvolatile storage media and the information handling system further comprises:
a physical button located on a surface of the information handling system that, when pressed by a user, causes the information handling system to reboot using the alternate boot media, wherein the set of instructions are executed during the reboot and perform additional actions that comprise:
executing a recovery utility stored on the second partition, wherein the recovery utility performs steps of:
reading the sector number recorded by the controller, wherein the controller is a hard disk drive controller and wherein the sector number is read from an error log maintained by the hard disk drive controller;
looking up the selected file identifier in the file map that is maintained by the operating system that executes when the information handling system is successfully booted from the primary nonvolatile storage media; and
retrieving the backup copy corresponding to the selected file identifier from the nonvolatile backup storage area included in the second partition.

13. A computer program product stored in a non-transitory computer readable medium, comprising functional descriptive material that, when executed by an information handling system, causes the information handling system to perform actions that include:
detecting that a file is unreadable, wherein the detecting occurs while booting a computer system to a primary environment, wherein the unreadable file is critical to the primary environment, and wherein the unreadable file causes a primary environment boot failure;
recording a sector number corresponding to an unreadable sector of a primary nonvolatile storage media encountered while the computer system is booting to the primary environment, wherein data corresponding to the unreadable file is stored in the unreadable sector;
in response to the primary environment boot failure, booting the computer system to an alternate environment using an alternate boot media, wherein the computer system has access to the primary nonvolatile storage media from the alternate environment;
while the computer system is in the alternate environment:
reading the recorded sector number;
mapping the recorded sector number to the unreadable file, wherein the mapping comprises reading a file map stored on the primary nonvolatile storage media, the file map including a plurality of that file identifiers and a plurality of sector numbers corresponding to one or more files stored on the primary nonvolatile storage media;
identifying the unreadable file based on the mapping of the unreadable sector number to a selected one of the plurality of file identifiers that corresponds to the unreadable file;
retrieving, from a backup media, a backup copy of the unreadable file based on the selected file identifier; and
writing the backup copy to one or more undamaged sectors of the primary nonvolatile storage media wherein the writing replaces the unreadable file with the backup copy, resulting in a replaced file within a file system structure; and
after the replacement of the unreadable file, successfully rebooting the computer system from the primary nonvolatile storage media into the primary environment, the rebooting including reading the replaced file from the one or more undamaged sectors.

14. The computer program product of claim 13 wherein the alternate boot media is a second partition of the primary nonvolatile storage media and further comprising functional descriptive material that causes the data processing system to perform additional actions that include:
receiving a selection from a user of the computer system indicating that the user has pressed a physical button located on a surface of the computer system, wherein the booting of the computer system to the alternate environment is performed in response to receiving the selection.

15. The computer program product of claim 13 further comprising functional descriptive material that causes the data processing system to perform additional actions that include:
while operating in the primary environment, periodically backing up the files corresponding to the plurality of file identifiers to the backup media.

16. The computer program product of claim 15 wherein the backup media is a second partition of the primary nonvolatile storage media.

17. The computer program product of claim 13 further comprising functional descriptive material that causes the data processing system to perform additional actions that include:

receiving an operating system update of one of the files listed in the plurality of file identifiers, wherein the files that correspond to the plurality of file identifiers are operating system files used to initialize the operating system;

storing the received file in the primary nonvolatile storage media where the received file will be executed a next time the primary environment is initialized; and updating a backup copy of the received file stored on the backup media by writing the received file to the backup media.

* * * * *